US009344334B2

(12) United States Patent
Sharp et al.

(10) Patent No.: US 9,344,334 B2
(45) Date of Patent: May 17, 2016

(54) NETWORK POLICY IMPLEMENTATION FOR A MULTI-VIRTUAL MACHINE APPLIANCE WITHIN A VIRTUALIZATION ENVIRONMENT

(71) Applicant: Citrix Systems, Inc., Fort Lauderdale, FL (US)

(72) Inventors: Richard Sharp, Cambridge (GB); David Scott, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/517,295

(22) Filed: Oct. 17, 2014

(65) Prior Publication Data

US 2015/0040183 A1  Feb. 5, 2015

Related U.S. Application Data

(63) Continuation of application No. 12/729,772, filed on Mar. 23, 2010, now Pat. No. 8,887,227.

(51) Int. Cl.
*H04L 29/00* (2006.01)
*H04L 12/24* (2006.01)
(Continued)

(52) U.S. Cl.
CPC ........ *H04L 41/0893* (2013.01); *G06F 9/45558* (2013.01); *H04L 63/20* (2013.01); *G06F 2009/45583* (2013.01); *G06F 2009/45595* (2013.01); *H04L 41/0816* (2013.01)

(58) Field of Classification Search
CPC ............ G06F 17/00; G06F 9/455; H04L 9/00
See application file for complete search history.

(56) References Cited

U.S. PATENT DOCUMENTS

2006/0212924 A1* 9/2006 Xie et al. .......................... 726/1
2006/0218544 A1  9/2006 Chakraborty et al.
(Continued)

FOREIGN PATENT DOCUMENTS

CN        101076782       11/2007
WO    WO-2006/063276      6/2006
(Continued)

OTHER PUBLICATIONS

U.S. Appl. No. 12/729,772, filed Mar. 23, 2010.
(Continued)

*Primary Examiner* — Brandon Hoffman
*Assistant Examiner* — Michael D Anderson
(74) *Attorney, Agent, or Firm* — Foley & Lardner LLP; John D. Lanza

(57) ABSTRACT

A networking policy implementation for a multi-virtual machine appliance that includes a method for selecting a network implementation by applying a network policy to existing network configurations within a virtualization environment of a computing device. A control program that executes within the virtualization environment, receives an event notification generated by a virtual machine in response to a lifecycle event. The control program, in response to receiving the notification, invokes a policy engine that applies a network policy to existing network configurations of the virtualization environment. This network policy can correspond to the virtual machine or to a network object connected to virtual interface objects of the virtual machine. The policy engine then identifies an existing network configuration that has attributes which satisfy the network policy, and selects a network implementation that satisfies the network policy and the network configuration.

20 Claims, 8 Drawing Sheets

(51) Int. Cl.
*G06F 9/455* (2006.01)
*H04L 29/06* (2006.01)

(56) References Cited

U.S. PATENT DOCUMENTS

| | | | |
|---|---|---|---|
| 2007/0113273 | A1 | 5/2007 | Shafer et al. |
| 2007/0174429 | A1 | 7/2007 | Mazzaferri et al. |
| 2008/0134178 | A1* | 6/2008 | Fitzgerald et al. ............. 718/1 |
| 2008/0184225 | A1 | 7/2008 | Fitzgerald et al. |
| 2009/0199177 | A1* | 8/2009 | Edwards et al. ............. 718/1 |
| 2009/0288135 | A1* | 11/2009 | Chang et al. ............. 726/1 |
| 2010/0199351 | A1 | 8/2010 | Protas |
| 2010/0242106 | A1 | 9/2010 | Harris et al. |

FOREIGN PATENT DOCUMENTS

| | | |
|---|---|---|
| WO | WO-2008/112769 | 9/2008 |
| WO | WO-2009/042919 | 4/2009 |

OTHER PUBLICATIONS

Chinese Office Action on 201110076194.X dated Apr. 17, 2013.
Chinese Office Action on 201110076194.X dated Sep. 16, 2013.
Extended European Search Report on 11159372.9 dated Sep. 20, 2011.
Notice of Allowance on U.S. Appl. No. 12/729,772 dated Jul. 14, 2014.
Office Action on U.S. Appl. No. 12/729,772 dated Feb. 20, 2013.
Office Action on U.S. Appl. No. 12/729,772 dated Apr. 16, 2014.
Office Action on U.S. Appl. No. 12/729,772 dated Oct. 8, 2013.
Office Action on U.S. Appl. No. 12/729,772 dated Jul. 31, 2012.
Extended European Search Report on 15175954.5 dated Nov. 9, 2015.

* cited by examiner

NETWORK POLICY IMPLEMENTATION FOR A MULTI-VIRTUAL MACHINE APPLIANCE WITHIN A VIRTUALIZATION ENVIRONMENT

CROSS-REFERENCE TO RELATED APPLICATION

This present application is continuation of U.S. patent application Ser. No. 12/729,772, titled "NETWORK POLICY IMPLEMENTATION FOR A MULTI-VIRTUAL MACHINE APPLIANCE WITHIN A VIRTUALIZATION ENVIRONMENT" filed Mar. 23, 2010, which is incorporated herein by reference in its entirety.

FIELD OF THE DISCLOSURE

This disclosure generally relates to establishing a network implementation. In particular, this disclosure relates to establishing a network implementation in a virtualization environment using network policies.

BACKGROUND OF THE DISCLOSURE

In many virtualization environments, virtual machine networking policies are explicitly configured by an administrator that indicates what networks can be used by the virtual machine, what interfaces can be used by the virtual machine to establish a network, and networking security policies for the virtual machine. Hard coding networking policies into a virtualization system often can be easily done when the virtualization system includes a minimum number of virtual machine, e.g. a single virtual machine.

When a virtualization environment includes multiple virtual machines, it can be difficult to explicitly and predictably configure each virtual machine in the virtualization environment. The time required to configure each virtual machine and manage the networking configurations can be great. Furthermore, it can be tedious to manage each networking configuration and ensure that the proper security measures are enforced.

Some systems include a virtualization environment where virtual machines on a single computer can communicate with other virtual machines on that computer using a local network. In these systems, the local network exists on the computer and does not extend to other virtual machines executing on a different computer. Both computers, in some instances, can be connected through a local network, thus there exists a need for virtual machines executing on these computers to be able to communicate with each other via a local network. While some systems support local networks between virtual machines executing on different computers, these systems often require that the network for each machine be individually configured. In these systems, an administrator must determine the security policy requirements for each virtual machine, and then must configure each virtual machine using the security policy requirements.

A system and method is therefore needed to address network configurations in a multi-virtual machine environment. Such a system and method can non-explicitly configure networks and can use multiple, different network topologies to implement network connectivity for one or more of the virtual machines in a virtual environment. Further, such a system can specify security requirements for a particular appliance or virtual machine using a network policy rather than explicitly configure the security policy for each virtual machine or appliance in a virtualization environment.

SUMMARY OF THE DISCLOSURE

In the broadest sense, this disclosure describes methods and systems for using a network policy to create network components and configure the network components according to security requirements. Using a network policy rather than individually create and configure network components for each virtual machine in a virtualization environment, allows an administrator to dynamically configure networks rather than explicitly configure a network topology for each virtual machine. Network policies are typically more portable and often do not require making changes to an application layer of a virtualization environment.

In one aspect, described herein is a method for selecting a network implementation by applying a network policy to existing network configurations within a virtualization environment of a computing device. A control program executing within the virtualization environment on a computing device, receives an event notification generated by a virtual machine responsive to a lifecycle event. In response to receiving the event notification, the control program invokes a policy engine that applies a network policy to existing network configurations of the virtualization environment. The network policy can correspond to a virtual machine, a network interface in the virtual machine, or a network. The policy engine then identifies a existing network configuration having attributes that satisfy the network policy, and selects a network implementation that satisfies the network configuration and the network policy.

In some embodiments, the virtual machine can include a virtual interface object that corresponds to a network object that includes the network policy.

In other embodiments, the event notification can occur responsive to a lifecycle event such as starting a virtual machine, migrating a virtual machine, rebooting a virtual machine, or stopping a virtual machine.

In one embodiment, the control program can identify one or more network configurations that include a virtual interface object and a network object. Wherein identifying one or more network configurations can include parsing metadata of a tool stack of the control program.

In other embodiments, the event notification is generated responsive to a lifecycle event requiring an execution server. The execution server can be selected based in part on the network policy of the virtual machine.

In some embodiments, the applied network policy can specify whether network traffic requires encryption. The applied network policy, in other embodiments, restricts a local network to a single host. In still another embodiment, the network policy specifies one or more physical interfaces for communicating network traffic.

In other aspects, described herein is a system for selecting a network implementation by applying a network policy to existing network configurations within a virtualization environment of a computing device. The system can include a computing device that executes a control program and a policy engine within the virtualization environment. A virtual machine can generate an event notification responsive to a lifecycle event. In some instances the control program receives the event notification and invokes the policy engine responsive to receiving the event notification. The policy engine can apply a network policy to existing network configurations of the virtualization environment, where the network policy corresponds to the virtual machine. The policy engine can then identify at least one existing network configuration that has attributes that satisfy the network policy, and select a network implementation that satisfies the network policy and the network configuration.

BRIEF DESCRIPTION OF THE DRAWINGS

The following figures depict certain illustrative embodiments of the methods and systems described herein, in which like reference numerals refer to like elements. These depicted embodiments are to be understood as illustrative of the disclosed methods and systems and not as limiting in any way.

DETAILED DESCRIPTION OF THE DRAWINGS

Figure 1A:
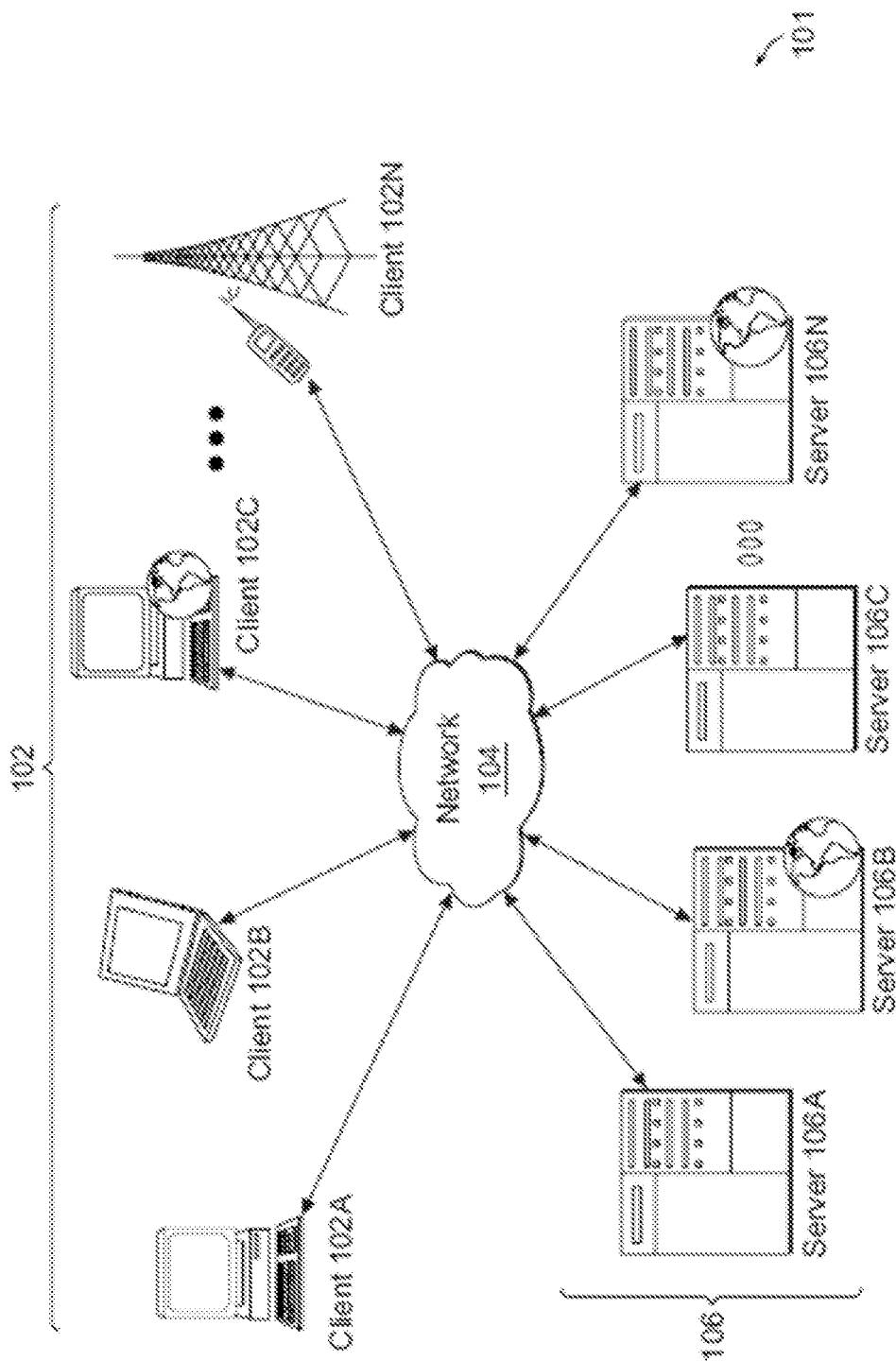
FIG. 1A depicts embodiments of network environments that provide remote access to computing devices that can execute application programs.

FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted server applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
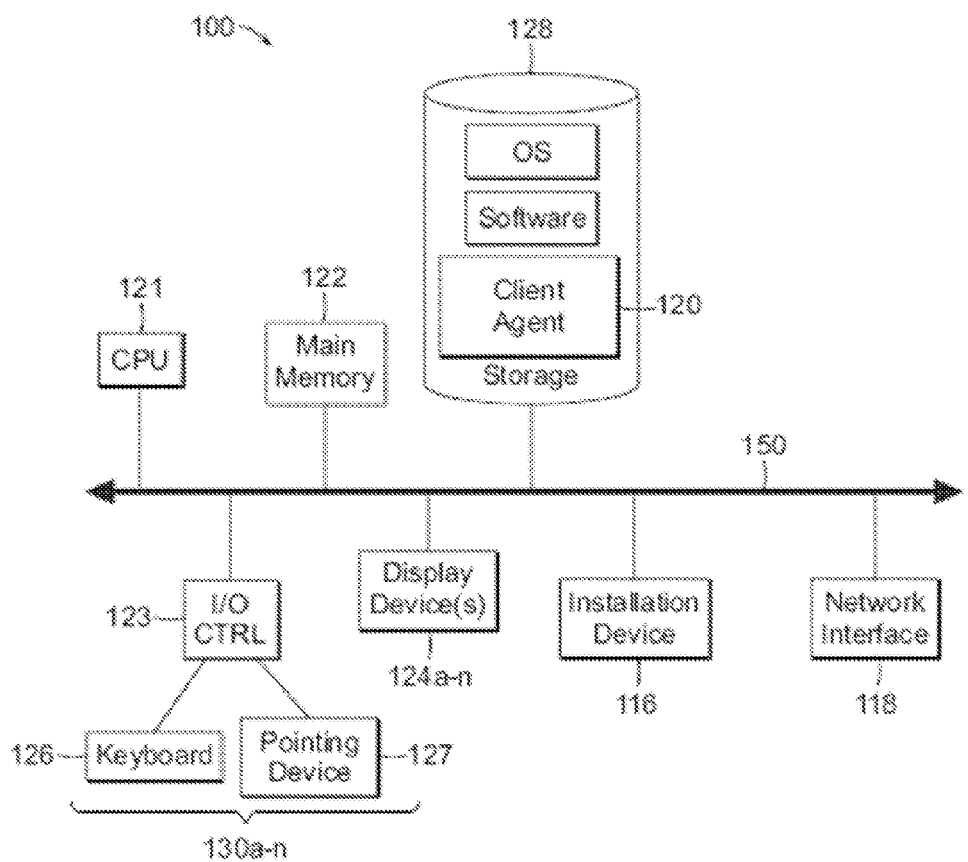
FIG. 1B and FIG. 1C are block diagrams that depict embodiments of computing devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
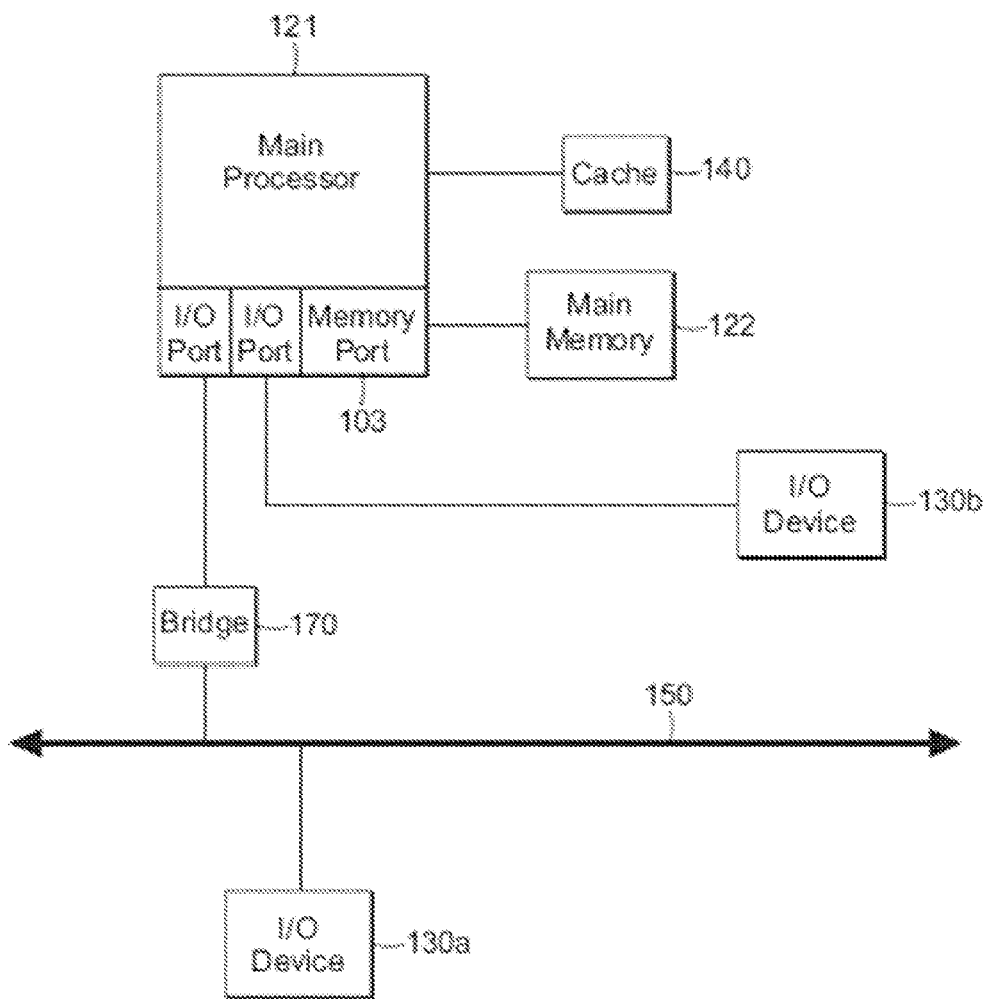

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Figure 2A:
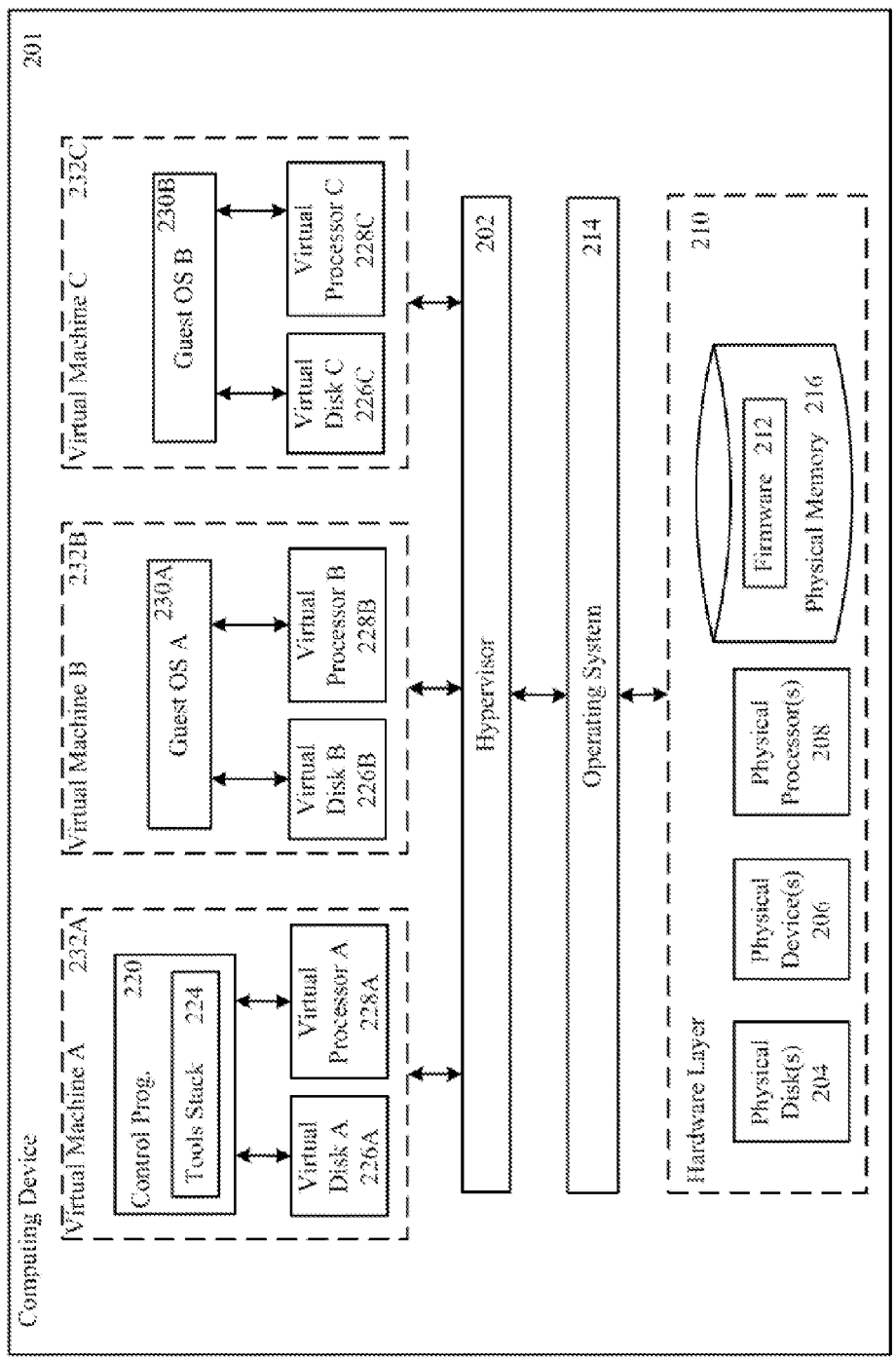
FIG. 2A and FIG. 2B are block diagrams that depict embodiments of a virtualization environment.

Illustrated in FIG. 2A is one embodiment of a virtualization environment. Included on a computing device 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The computing device 201 can further include an operating system 214 that can be stored in a memory element in the physical memory 216 and executed by one or more of the physical processors 208. Still further, a hypervisor 202 can be stored in a memory element in the physical memory 216 and can be executed by one or more of the physical processors 208. Executing on one or more of the physical processors 208 can be one or more virtual machines 232A-C (generally 232). Each virtual machine 232 can have a virtual disk 226A-C and a virtual processor 228A-C. In some embodiments, a first virtual machine 232A can execute, on a virtual processor 228A, a control program 220 that includes a tools stack 224. In other embodiments, one or more virtual machines 232B-C can executed, on a virtual processor 228B-C, a guest operating system 230A-B.

Further referring to FIG. 2A, and in more detail, in one embodiment the virtualization environment described includes a Type 2 hypervisor 202, or a hypervisor that executes within an operating system 214 executing on the computing device 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system.

In some embodiments, the virtualization environment includes a computing device 201. The computing device 201 can be any computing device, and in some embodiments the computing device 201 can be any computer, device or computing machine described herein. While FIG. 2A illustrates a single computing device 201, in some embodiments the modules, programs, virtual machines, and commands stored and executed by the computing device 201 can be executed by more than one computing device 201. In still other embodiments, the computing device 201 can be a server farm.

In one embodiment, the computing device 201 can include a hardware layer 210 that includes one or more pieces of hardware that communicates with the computing machine 201. In some embodiments, the hardware layer 210 can include any hardware included in the computing device 201. In other embodiments, the hardware layer 210 can include one or more physical disks 204, one or more physical devices 206, one or more physical processors 208 and memory 216.

The hardware layer 210, in some embodiments, can include one or more physical disks 204. A physical disk 204 can be any hard disk, while in some embodiments a physical disk 204 can be any hard disk described herein. In some embodiments, the hardware layer 210 can include one physical disk 204. In other embodiments, the hardware layer 210 can include more than one physical disk 204. The computing device 201, in some embodiments, can communicate with an external hard disk that is included in the hardware layer 210 as a physical disk 204.

In other embodiments, the hardware layer 210 can include a processor 208. The processor 208, in some embodiments, can be any processor, while in other embodiments the processor 208 can be any processor described herein. The processor 208 can include one or more processing cores. In other embodiments the computing device 201 can include one or more processors 208. In some embodiments, the computing device 201 can include one or more different processors, e.g. a processing unit, a graphics processing unit, or a physics engine.

Physical devices 206, in some embodiments, can be any device included in the computing device 201. In some embodiments, physical devices 206 can be any combination of devices included in the computing device 201 and external devices that communicate with the computing device 201. The computing device 201, in some embodiments, can include one or more physical devices 206. A physical device 206 can be any of the following: a network interface card; a video card; a keyboard; a mouse; an input device; a monitor; a display device; speakers; an optical drive; a storage device; a universal serial bus connection; any device connected to the computing device 201; any device communicating with the computing device 201; a printer; a scanner; or any other device or device described herein.

The hardware layer 210 can further include physical memory 216 that can include any type of memory. In some embodiments, the physical memory 216 can include any memory type described herein. The physical memory 216 can store data, and in some embodiments can store one or more programs, or set of executable instructions. FIG. 2A illustrates one embodiment where firmware 212 is stored within the physical memory 216 of the computing device 201. Programs or executable instructions stored in the physical memory 216 can be executed by the one or more processors 208 of the computing device 201.

Firmware 212, in some embodiments, can be any combination of executable instructions and hardware that controls hardware communicating with or included within the computing device 201. In some embodiments, the firmware 212 can control one or more pieces of hardware within the hardware layer 210. Firmware 212, in many embodiments, can be executed by one or more processors 208 within the computing device 201. In some embodiments, the firmware 212 can be boot firmware such as the basic input/output system (BIOS.) Additional firmware 212 executing on the computing device 201 can interface with the BIOS.

In one embodiment, the computing device 201 can include an operating system 214 executed by one or more physical processors 208. In some embodiments, the operating system 214 is a user operating system that can directly access the hardware devices in the hardware layer 210. The operating system 214 can be any operating system and in some embodiments, the operating system 214 can be any operating system described herein. FIG. 2A illustrates one embodiment where the hypervisor 202 executes within the context of the operating system 214 executing on the computing device 201. In this embodiment, the operating system 214 can be referred to as a host operating system 214, while the other operating systems can be referred to as guest operating systems. Guest operating systems can include the guest operating systems 230A-B executing on the virtual machines 232, and/or the control program 220.

In some embodiments, the computing device 201 can include a hypervisor 202. A hypervisor 202, in some embodiments, can be a program that executed by processors 208 on the computing device 201 to manage any number of virtual machines. The hypervisor 202 can be referred to as a virtual machine monitor, or platform virtualization software. In some embodiments, a hypervisor 202 can be any combination of executable instructions and hardware that monitors virtual machines executing on a computing machine. While FIG. 2A illustrates a virtualization environment that includes a Type 2 hypervisor 202, the computing device 201 can execute any other type of hypervisor. For example, the computing device 201 can execute a virtualization environment that includes a Type 1 hypervisor 202. In some embodiments, the computing device 201 can execute one or more hypervisors 202. These one or more hypervisors 202 can be the same type of hypervisor or a different hypervisor type.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices; physical disks; physical processors; physical memory 216 and any other component included in the computing device 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the computing device 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 201 executes a hypervisor 202 that creates a virtual machine platform on which guest operating systems may execute. In these embodiments, the computing device 201 can be referred to as a host server. An example of such a computing device is the XEN SERVER provided by Citrix Systems, Inc., of Fort Lauderdale, Fla.

In one embodiment, the hypervisor 202 can create a virtual machine 232A-B (generally 232) in which an operating system 230 executes. In one of these embodiments, for example, the hypervisor 202 loads a virtual machine image to create a virtual machine 232. In another of these embodiments, the hypervisor 202 executes an operating system 230 within the virtual machine 232. In still another of these embodiments, the virtual machine 232 executes an operating system 230.

In one embodiment, the hypervisor 202 controls the execution of at least one virtual machine 232. In another embodiment, the hypervisor 202 presents at least one virtual machine 232 with an abstraction of at least one hardware resource provided by the computing device 201. The abstraction can further be referred to as a virtualization or virtual view of the hardware, memory processor and other system resources available on the computing device 201. Hardware or hardware resources, in some embodiments, can be any hardware resource available within the hardware layer 210. In other embodiments, the hypervisor 202 controls the manner in which virtual machines 232 access the physical processors 208 available in the computing device 201. Controlling access to the physical processors 208 can include determining whether a virtual machine 232 should have access to a processor 208, and how physical processor capabilities are presented to the virtual machine 232.

In some embodiments, the computing device 201 can host or execute one or more virtual machines 232. A virtual machine 232 can be called a domain, a guest and/or a DOMAIN U. A virtual machine 232 is a set of executable instructions that, when executed by a processor 208, imitate the operation of a physical computer such that the virtual machine 232 can execute programs and processes much like a physical computing device. While FIG. 2A illustrates an embodiment where a computing device 201 hosts three virtual machines 232, in other embodiments the computing device 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. The hypervisor 202, in other embodiments, provides each virtual machine 232 with a substantially similar virtual view of the physical hardware, memory, processor and other system resources available to the virtual machines 232.

Each virtual machine 232 can include a virtual disk 226A-C (generally 226) and a virtual processor 228A-C (generally 228.) The virtual disk 226, in some embodiments, is a virtualized view of one or more physical disks 204 of the computing device 201, or a portion of one or more physical disks 204 of the computing device 201. The virtualized view of the physical disks 204 can be generated, provided and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the computing device 201. In some embodiments, the virtualized view of the physical processors 208 can be generated, provided and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

A control program 220 may execute at least one application for managing and configuring the guest operating systems executing on the virtual machines 232 and in some embodiments the computing device 201. In some embodiments, the control program 220 can be called a control operating system, a control domain, domain 0 or dom 0. The control program 220, in some embodiments, can be DOMAIN o or DOM0 of the XEN hypervisor. The control program 220 can execute an administrative application or program that can further display a user interface which administrators can use to access the functionality of each virtual machine 232 and/or to manage the virtual machines 232. Tn some embodiments, the user interface generated by the administrative program can be used to terminate the execution of virtual machines 232, allocate resources to virtual machines 232, assign permissions to virtual machines 232, or manage security credentials associated with virtual machines 232. The control program 220, in some embodiments, can start new virtual machines 232 or terminate execution of executing virtual machines 232. In other embodiments, the control program 220 can directly access hardware and/or resources within the hardware layer 210. In still another embodiment, the control program 220 can interface with programs and applications executing on the computing device 210 and outside of the context of a virtual machine 232. Similarly, the control program 220 can interface with programs and applications executing within the context of a virtual machine 232.

In one embodiment, the hypervisor 202 can execute the control program 220 within a virtual machine 232. The hypervisor 202 can create and start the virtual machine 232. In embodiments where the hypervisor 202 executes the control program 220 within a virtual machine 232, that virtual machine 232 can be referred to as the control virtual machine 232. In still another embodiment, the control program 220 executes within a virtual machine 232 that is authorized to directly access physical resources on the computing device 201.

In some embodiments, a control program 220A (Not Shown) on a first computing device 201A (Not Shown) may exchange data with a control program 220B (Not Shown) on a second computing device 201B (Not Shown). In these embodiments the first computing device 201A may be located remote from the second computing device 201B. The control programs 220A-B can exchange data via a communication link between a hypervisor 202A (Not Shown) executing on the first computing device 201A and a hypervisor 202B (Not Shown) executing on the second computing device 201B. Through this communication link, the computing devices 201A-B can exchange data regarding processors and other physical resources available in a pool of resources. Further, through this connection between hypervisors 202A-B, the hypervisors 202A-B can manage a pool of resources, e.g. the resources available on the first computing device 201A and the second computing device 201B, distributed across one or more computing devices 201A-B. The hypervisors 202A-B can further virtualize these resources and make them available to virtual machines 232 executing on the computing devices 201A-B. In another instance of this embodiment, a single hypervisor 202 can manage and control virtual machines 232 executing on both computing devices 201A-B.

In some embodiments, the control program 220 interacts with one or more guest operating systems 230A-B (generally 230.) The control program 220 can communicate with the guest operating systems 230 through a hypervisor 202. Through the hypervisor 202, the guest operating system 230 can request access to physical disks 204, physical processors 208, memory 216, physical devices 206 and any other component in the hardware layer 210. In still other embodiments, the guest operating systems 230 can communicate with the control program 220 via a communication channel established by the hypervisor 202, such as, for example, via a plurality of shared memory pages made available by the hypervisor 202.

In some embodiments, the control program 220 includes a network back-end driver for communicating directly with networking hardware provided by the computing device 201. In one of these embodiments, the network back-end driver processes at least one virtual machine request from at least one guest operating system 230. In other embodiments, the control program 220 includes a block back-end driver for communicating with a storage element on the computing device 201. In one of these embodiments, the block back-end driver reads and writes data from the storage element based upon at least one request received from a guest operating system 230.

In another embodiment, the control program 220 includes a tools stack 224. In another embodiment, a tools stack 224 provides functionality for interacting with the hypervisor 202, communicating with other control programs 220 (for example, on a second computing device 201B), or managing virtual machines 232 on the computing device 201. In another embodiment, the tools stack 224 includes customized applications for providing improved management functionality to an administrator of a virtual machine farm. In some embodiments, at least one of the tools stack 224 and the control program 220 include a management API that provides an interface for remotely configuring and controlling virtual machines 232 running on a computing device 201. In other embodiments, the control program 220 communicates with the hypervisor 202 through the tools stack 224.

In one embodiment, the hypervisor 202 executes a guest operating system 230 within a virtual machine 232 created by the hypervisor 202. In another embodiment, the guest operating system 230 provides a user of the computing device 201 with access to resources within a computing environment. In still another embodiment, a resource includes a program, an application, a document, a file, a plurality of applications, a plurality of files, an executable program file, a desktop environment, a computing environment, or other resource made available to a user of the computing device 201. In yet another embodiment, the resource may be delivered to the computing device 201 via a plurality of access methods including, but not limited to, conventional installation directly on the computing device 201, delivery to the computing device 201 via a method for application streaming, delivery to the computing device 201 of output data generated by an execution of the resource on a second computing device 201' and communicated to the computing device 201 via a presentation layer protocol, delivery to the computing device 201 of output data generated by an execution of the resource via a virtual machine executing on a second computing device 201', or execution from a removable storage device connected to the computing device 201, such as a USB device, or via a virtual machine executing on the computing device 201 and generating output data. In some embodiments, the computing device 201 transmits output data generated by the execution of the resource to another computing device 201'.

In one embodiment, the guest operating system 230, in conjunction with the virtual machine on which it executes, forms a fully-virtualized virtual machine that is not aware that it is a virtual machine; such a machine may be referred to as a "Domain U HVM (Hardware Virtual Machine) virtual machine" In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 202. In such an embodiment, the driver is typically aware that it executes within a virtualized environment.

In another embodiment, the guest operating system 230, in conjunction with the virtual machine on which it executes, forms a paravirtualized virtual machine, which is aware that it is a virtual machine; such a machine may be referred to as a "Domain U PV virtual machine" In another embodiment, a paravirtualized machine includes additional drivers that a fully-virtualized machine does not include. In still another embodiment, the paravirtualized machine includes the network back-end driver and the block back-end driver included in a control program 220, as described above.

Figure 2B:
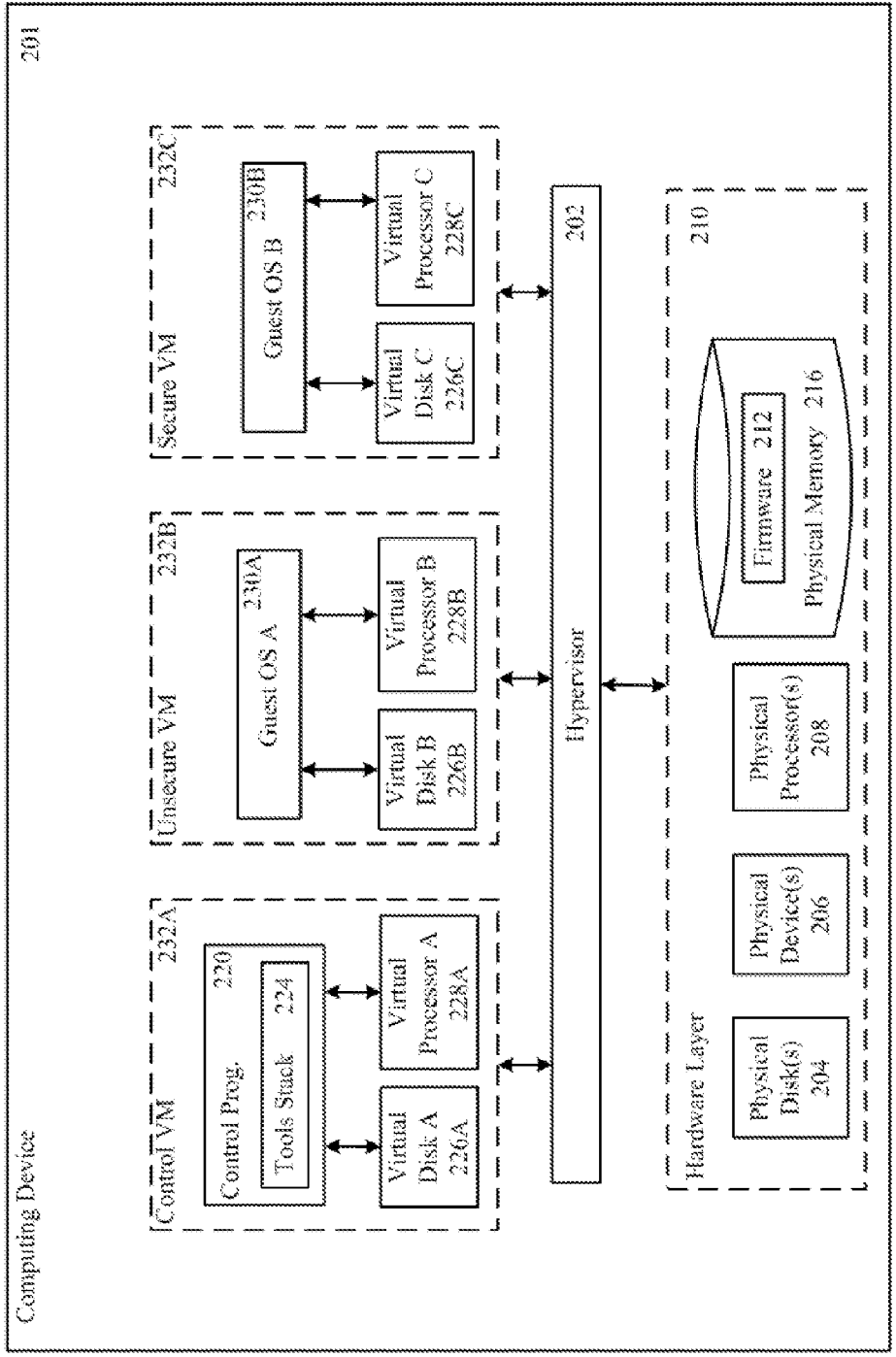

Illustrated in FIG. 2B is another embodiment of a virtualization environment that illustrates a Type 1 hypervisor 202. Executing on the computing device 201 is a hypervisor 202 that can directly access the hardware and resources within the hardware layer 210. Virtual machines 232 managed by the hypervisor 202 can be an unsecure virtual machine 232B and/or a secure virtual machine 232C. Whereas the virtualization environment depicted in FIG. 2A illustrates a host operating system 214, the virtualization environment embodiment in FIG. 2B does not execute a host operating system.

Further referring to FIG. 2B, and in more detail, the virtualization environment includes a Type 1 hypervisor 202. Type 1 hypervisors 202, in some embodiments, execute on "bare metal," such that the hypervisor 202 has direct access to all applications and processes executing on the computing device 201, all resources on the computing device 201 and all hardware on the computing device 201 or communicating with the computing device 201. While a Type 2 hypervisor 202 accesses system resources through a host operating system 214, a Type 1 hypervisor 202 can directly access all system resources. The Type 1 hypervisor 202 can execute directly on one or more physical processors of the computing device 201, and can include program data stored in the physical memory 216.

In a virtualization environment that employs a Type 1 hypervisor 202 configuration, the host operating system can be executed by one or more virtual machines 232. Thus, a user of the computing device 201 can designate one or more virtual machines 232 as the user's personal machine. This virtual machine can imitate the host operating system by allowing a user to interact with the computing device 201 in substantially the same manner that the user would interact with the computing device 201 via a host operating system 214.

Virtual machines 232 can be unsecure virtual machines 232B and secure virtual machine 232C. While FIG. 2B illustrates a secure and unsecure virtual machine, sometimes they can be referred to as privileged and unprivileged virtual machines. In some embodiments, a virtual machine's security can be determined based on a comparison of the virtual machine to other virtual machines executing within the same virtualization environment. For example, were a first virtual machine to have access to a pool of resources, and a second virtual machine not to have access to the same pool of resources; the second virtual machine could be considered an unsecure virtual machine 232B while the first virtual machine could be considered a secure virtual machine 232A. In some embodiments, a virtual machine's 323 ability to access one or more system resources can be configured using a configuration interface generated by either the control program 220 or the hypervisor 202. In other embodiments, the level of access afforded to a virtual machine 232 can be the result of a review of any of the following sets of criteria: the user accessing the virtual machine; one or more applications executing on the virtual machine; the virtual machine identifier; a risk level assigned to the virtual machine based on one or more factors; or any other similar criteria.

In some embodiments, unsecure virtual machines 232B may be prevented from accessing resources, hardware, memory locations, and programs that secure virtual machines 232A may access. For example, a secure virtual machine 232C may be able to access one or more company resources, while the unsecure virtual machine 232B cannot access any company resources.

Figure 3A:
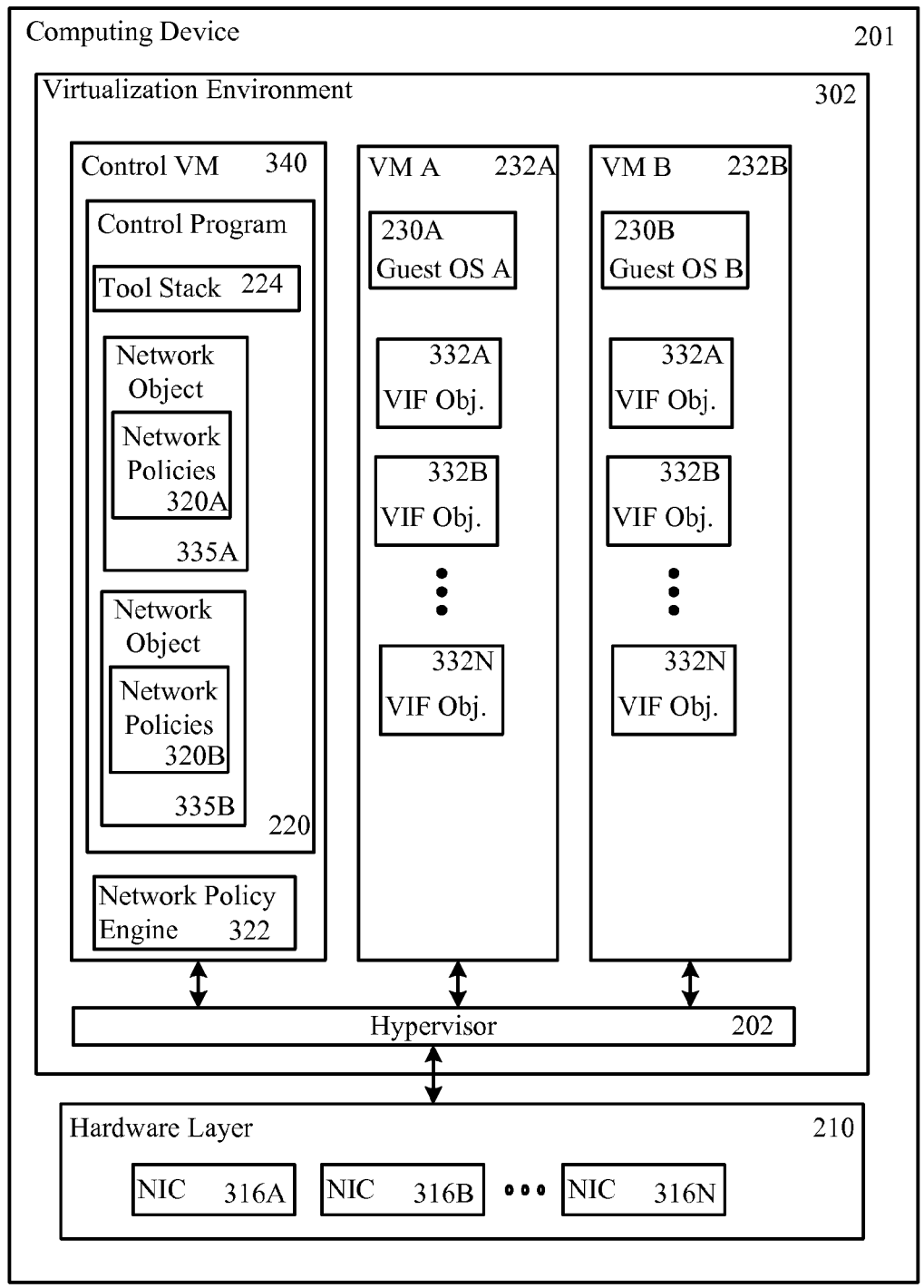
FIGS. 3A-3B are block diagrams that depict embodiments of a virtualization environment that implements a network policy engine.

Illustrated in FIG. 3A is an embodiment of a computing device 201 that executes a virtualization environment 302 and that has a hardware layer 210 that can include multiple network interface cards (NIC) 316A-316N. The virtualization environment 302 can include a control virtual machine 340, one or more additional virtual machines 232A-232B and a hypervisor 202. In some instances each additional virtual machine 232 can execute a guest operating system (guest OS) 230A-230B, and can include one or more virtual interface (VIF) objects 332A-332N. The control virtual machine 340 can execute a control program 220 and a network policy engine 322. In some instances, the control program 220 can include a tool stack 224 and one or more network objects 335A-335B that include or implement network policies 320A-320B.

Further referring to FIG. 3A, and in more detail, in one embodiment the computing device 201 can be any computing device 100 described herein. In some embodiments, the computing device 201 can be a server 106 or a client 102. The computing device 201 can be referred to a host, a computer, a first computer, a second computer, a third computer, etc.

As the computing device 201 can be any computing machine 100 described herein, so too the hardware layer 210 can be any hardware layer 210 described herein and can include any computer hardware described herein. In one embodiment, the hardware layer 210 can include one or more NICs 316A-316N. The computing device 201 can include a single NIC 316, two NICs 316 or any other number of NICs 316. The NIC 316 can be any NIC, and each NIC 316 included in the hardware layer 210 can either be the same NIC or can be different types of NICs.

The virtualization environment 302 executing on the computing device 201, can be any virtualization environment described herein. The virtualization environment 302 can include any hypervisor configuration, such as the hypervisor configuration illustrated in FIG. 2A or the hypervisor configuration illustrated in FIG. 2B. In one embodiment, the hypervisor 202 included in the virtualization environment 302 can be any hypervisor 202, or any hypervisor 202 described herein.

FIG. 3A illustrates a computing machine 302 that includes a virtualization environment 302 which includes a control virtual machine 340, such as any control virtual machine 340 described herein. The control virtual machine 340 can execute a control program 220, such as any control program 220 described herein. The control program 220 can, in some embodiments, include a tool stack 224 which can include metadata that describes one or more network configurations. While FIG. 3A illustrates a virtualization environment 302 that includes a control virtual machine 340 and two additional virtual machine 232A-232B, in some embodiments the virtualization environment 302 can include any number of virtual machines 232. The virtual machines 232 can execute a guest operating system 230, such as any guest operating system 230 described herein.

In some embodiments, the tool stack 224 can include metadata that describes the objects included in one or more of the virtual machines 232 of the virtualization environment 302. The metadata, for example, can include information about the current configuration of each virtual machine 232. Configuration information can include: network configurations used by objects within a virtual machine 232; the number and type of interface objects within a virtual machine 232; what objects are currently running in a virtual machine 232; and which external machines and networks are currently interfacing with the virtual machine 232. In one embodiment, the metadata can include network objects 335 and network policies 320. The tool stack 224, in some embodiments, can be used to generate a network implementation for a virtual machine 232 to use to communicate with other virtual machines 232 or to access a public network.

Tool stack 224 metadata, in some embodiments, can be stored in a storage repository of the control virtual machine 340. The metadata can be generated by the virtual machines 232 and objects executing within the virtualization environment 302. In other embodiments, the tool stack 224 metadata can be dynamically obtained from a storage repository remotely located from the host machine 201. For example, the control program 220 can stream or download the metadata from a remote computer that stores the tool stack metadata for a virtualization system. In other embodiments, the tool stack 224 metadata can be updated or generated using metadata downloaded or streamed from a remote computer. For example, when a control virtual machine 340 boots or executes a control program 220, the control virtual machine 340 or control program 220 can query a remote computer for tool stack metadata updates. In response, the remote computer can transmit, stream or otherwise send the control virtual machine 340 metadata relating to the virtualization environment 302.

The control program 220 can further include one or more network objects 335A-335B. Although FIG. 3A illustrates network objects 335A-335B (hereinafter generally referred to as network objects 335) included in the control program 220, in other embodiments the network objects 335 can be stored in any of the following places: the control virtual machine 340; the tool stack 224 metadata; or a remote storage repository located on a remote virtual machine 232 or a remote physical machine. A network object 335, in some embodiments, can be an object configured to connect to one or more VIF objects 332. In still other embodiments, the network object 335 can execute one or more network policies 320A-320B. The network object 335 can define a particular network policy. In another embodiment, the network object 335 can define a network configuration that includes one or more network policies 320A-320B. Thus, when a VIF object 332 connects to a network object 335, that VIF object 332 can function according to the network policy or configuration included within the network object 335.

FIG. 3A illustrates a virtualization environment 302 that includes two network objects 335A-335B. In other embodiments, the virtualization environment 302 can include a single network object 335, or multiple network objects 335. Network objects 335, in some embodiments, can connect with VIF objects 332 within the same virtualization environment 302, e.g. the same virtualization environment 302 that encompasses the network objects 335 and the VIF objects 332. In other embodiments, the network objects 335 can connect with VIF objects 332 located on the same physical machine 201 as the network objects 335, and/or VIF objects 332 that are located on a different physical machine than the physical machine 201 on which the network objects 335 are located. For example, a network object 335 on one computing device 201 can connect with VIF objects 332 on another computing device remotely located from the initial computing device 201.

Network policies 320, in some embodiments, can be one or more policies associated with a particular network configuration. For example, a network policy 320 can include a set of guidelines by which an object executing within a virtual machine 232 can interact with other objects within other virtual machines 232. In some embodiments, a network policy can be used to specify the attributes of a network that can be created between one or more virtual machines 232. These attributes can include: whether and how to encrypt data transmitted over the connection; which NIC cards to use to establish the connection; whether to restrict network traffic to a particular physical computer 201; whether to avoid transmitting network traffic to a particular virtual machine 232; whether network traffic can or should be transmitted over a physical NIC 316 to virtual machines 232 executing on a remote physical computer; whether to compress data before transmitting over the network; any other network attribute. Configuring the attributes of a network connection can further include specifying sub-attributes such as the type of encryption algorithm, the type of NIC card, and other similar sub-attributes.

Network policies 320 can be written in one or more policy languages and can be configured by administrators using a configuration application that interfaces with the control program 220. In some embodiments, the network objects 335 can implement a single network policy that specifies one or more attributes of a network configuration. In other embodiments, the network objects 335 can implement one or more network policies that together create a network configuration that specifies one or more attributes of a particular network.

Specifying attributes such as those requiring that network traffic not be transmitted to or generated by a particular virtual machine or physical machine, can be accomplished by associating the virtual or physical object with a tag. When creating the network policy 320, the policy language can reference the tag associated with the object. For example, an identification tag can be stored on or otherwise associated with a virtual machine 232. When a network policy 320 is created that specifies that network traffic should not be transmitted to the tagged virtual machine, the network policy 320 can identify the virtual machine using the tag. Thus, if the network object 335 that includes the network policy 320 is moved to a different virtualization environment 302 or computer 201, the network object 335 does not need to be reconfigured. Rather, the network object 335 will continue to implement a network configuration that prevents network traffic from being routed or otherwise transmitted to a virtual machine containing the specified tag. Therefore, when the network policy 320 is implemented, any virtual machine 232 in the new virtualization environment 302 or computer 201 that stores or is associated with the specified tag will be avoided such that it will not receive network traffic.

One example of a policy language can include the following:

ALLOW_CROSS_SERVER=true
    REQUIRE_ENCRYPTION=true
    PHYSICAL_IFS_ALLOWED={TAG(testdev_network1), TAG(testdev_network2)}
    ISOLATE_FROM={NAME(my_insecure_vm)}

The above code illustrates one embodiment of a network policy that specifies that one or more virtual machines which reside on an appliance, can reside on separate physical computers which are connected via a local network 104. In this embodiment, the network traffic should be encrypted (e.g. REQUIRE_ENCRYPTION=true) and the traffic should be serviced by network interface cards 316 that have or are associated with the following tags: testdev_network1; and testdev_network2. Further, this embodiment illustrates a restriction on network traffic where the network traffic cannot traverse any network that is connected to a virtual machine 232 or appliance with the tag "my_insecure_vm."

The control virtual machine 340, in some embodiments, can execute a network policy engine 322 that can be used to enforce or implement one or more network policies 320. The network policy engine 322 can interface with one or more network objects 335 and one or more network policies 320 of the network objects 335. These policies 320 can be stored in a storage repository such as cache memory, and can be stored in a data element such as a database, a list, a table or any other storage element. In some embodiments, the policy engine 322 can be invoked by a control virtual machine 340 when the control virtual machine 340 receives an API call to change the state of one or more virtual machines 232. In other embodiments, the policy engine 322 can be invoked by the virtualization environment 302 or directly by the virtual machine 232 experiencing the lifecycle event. Upon being invoked, the network policy engine 322 can perform one or more functions including identifying one or more network objects 335 that correspond to the VIF object(s) included in the virtual machine 232 experiencing the life event. When the network policy engine 322 fails to identify a network object 335 that includes a network configuration that matches up with one or more VIF objects of the virtual machine 232, an error can be thrown by the network policy engine 322 indicating that a network configuration could not be assembled.

While FIG. 3A illustrates a network policy engine 322 executing on a control virtual machine 340, in some embodiments an instantiated instance of a network policy engine 322 can execute on any virtual machine 232. In still other embodiments, the network policy engine 322 can execute on the hypervisor 202.

In other embodiments, each virtual machine 232 can include one or more virtual interface (VIF) objects 332. A VIF object 332 can be used to establish a local network between two or more virtual machines 232. In some embodiments, the VIF object 332 can interface with a network object 335 such that the network object 335 enforces a network policy 320 that dictates what the attributes of the network connecting the VIF objects 332 should be. In other embodiments, one or more VIF objects 332 can register with a network object 335, such that the network object 335 can facilitate the creation of a local network between the VIF objects 332 registered with that network object. A VIF object 332, in some embodiments, can communicate with other VIF objects 332 over a local network. In other embodiments, the VIF object 332 can communicate with other VIF objects 332 on a remote physical computer such that a local network is established between the VIF objects 332, however, the local network requires interfacing with a NIC 316 to establish the local network with those VIF objects 332 on the remote computer. The network policy or configuration of the network object 335 can outline the attributes of the network created between the VIF objects 332.

In some embodiments, each virtual machine 232 can generate a notification when a lifecycle event occurs. A lifecycle event can include: starting or restarting a virtual machine; stopping a virtual machine; migrating a virtual machine; or other similar lifecycle events. The notification can include the generation of an alert that the virtual machine 232 can transmit to a control virtual machine 340. When a lifecycle event occurs, a determination can be made by a virtualization environment 302 as to whether a networking topology is required for that virtual machine 232. The networking topology can be created using network policies, and in some embodiments can include establishing a local network between the virtual machine 232 and other virtual machines, or establishing a connection between the virtual machine 232 and a physical network interface card 316. The control program 220 or virtualization environment 302 can create the network topology in accordance with one or more network policies 320.

Figure 3B:
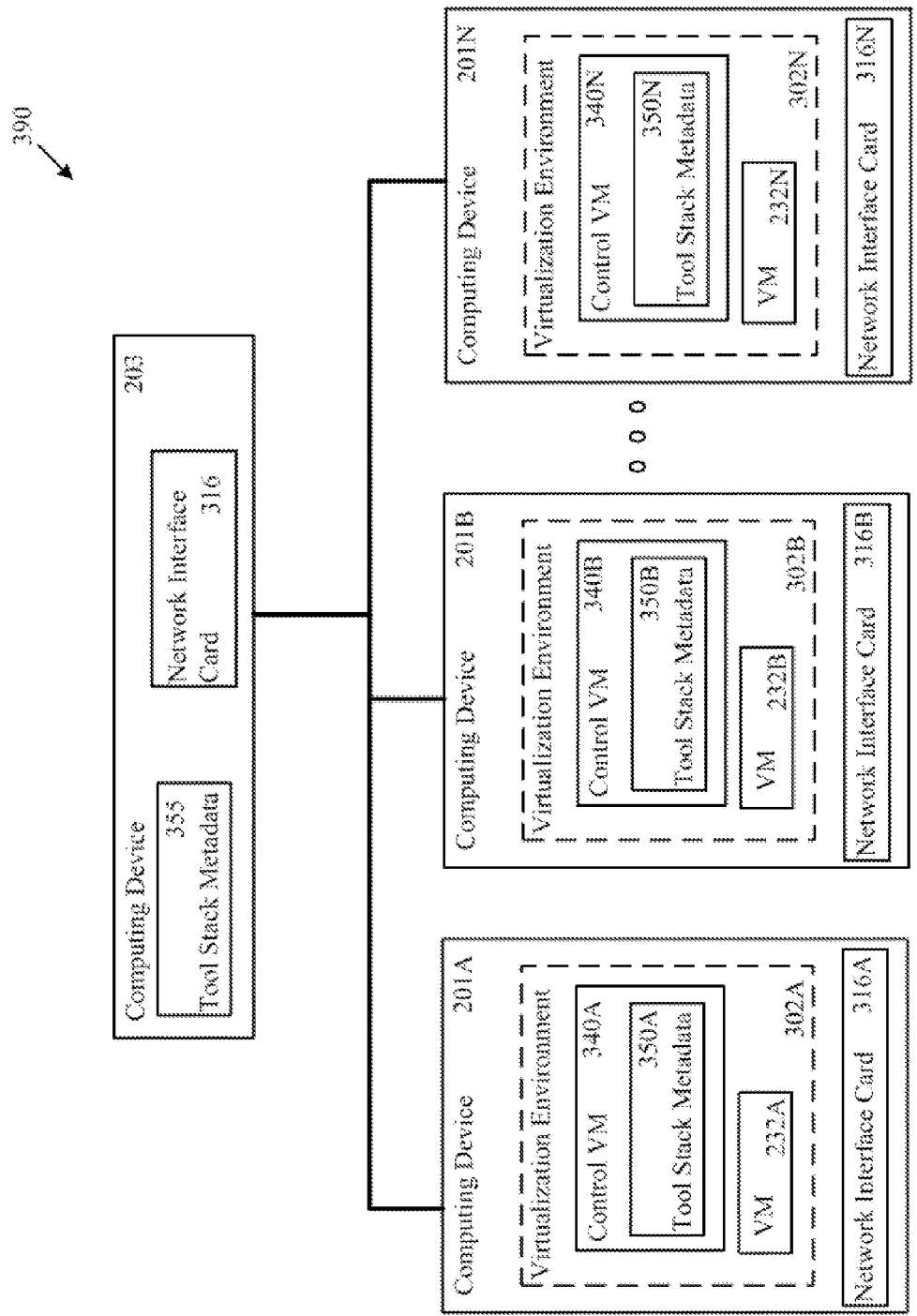

Illustrated in FIG. 3B is one embodiment of a virtualization system 390 that includes one or more computing devices 201A-201N, and a control computing device 203 that includes tool stack metadata 355 and a network interface card 316. Each computing device 201A-201N can include a virtualization environment 302 that includes a control virtual machine 340 and one or more additional virtual machines 232, one or more NIC(s) 316, and a control virtual machine 340 that further includes tool stack metadata 350.

Further referring to FIG. 3B, and in more detail, in one embodiment the virtualization system 390 can be an environment where multiple computing device 201 executing their own virtualization environment 302, can communicate with one another and with a control computer 203 that provides each computing device 201 with access to shared resources. In some embodiments, the computing devices 201 and the control computer 203 can communicate via a network 104 such as any network 104 described herein. In other embodiments, the computing device 201 and the control computer can be any computer 101 described herein.

Each computing device 201 can, in some embodiments, be any embodiment of the computing device 201 depicted in FIG. 3A. Similarly, each computing device 201 can be a different configuration of the computing device 201 illustrated in FIG. 3A, than the configuration of another computer 201 in the virtualization system 390. In some embodiments, the computing devices 201 can communicate with one another via a network 104 and a NIC 316.

The control computer 203, in some embodiments, can include a NIC 316 such as any NIC 316 described herein.

Further, the control computer 203 can communicate with the other computer 201 via a network 104 and the NIC 316 of the control computer 203.

In some embodiments, the control computer 203 can further include tool stack metadata 355 that can be a collection of metadata 355 for each computing device 201 in the system 390. The tool stack metadata 355, in some embodiments, is a combination of the tool stack metadata 350 for each computing device 201. When a control virtual machine 340 boots or when a virtualization environment 302 executes, the control virtual machine 340 or another application executing in the virtualization environment 302 can obtain metadata 350 from the pool of metadata 355 stored on the control computer 203. The obtained metadata 350 can be stored on the virtual machine 232 requesting the metadata 350, and can be used to update the metadata stored on the virtual machine 232. When a control virtual machine 340 stops executing, the metadata 350 can be transmitted to the metadata 355 pool. In some embodiments, the metadata 355, 350 can store network objects 335. Creating a local network that includes virtual machines 232 executing on remote physical computers can require using a centralized network object 335 stored in the tool stack metadata 355 of the control computer 203.

In some instances, a local network can be created between one virtual machine 232A on one computer 201A and a second virtual machine 232B on a second computer 201B remotely located from the first computer 201A. In this instance, the local network can be created using VIF objects in each virtual machine 232A, 232B. The VIF objects can register with a network object 335 such that the network object 335 can create a local network between the VIF objects in accordance with a network policy or configuration of the network object 335. In this example, the network object 335 can be part of metadata that is downloaded from a main metadata store 355, or the network object 335 can be accessed by the computing device 201A-201B through a network between the computers 201A-201B and the control computer 203.

Figure 4:
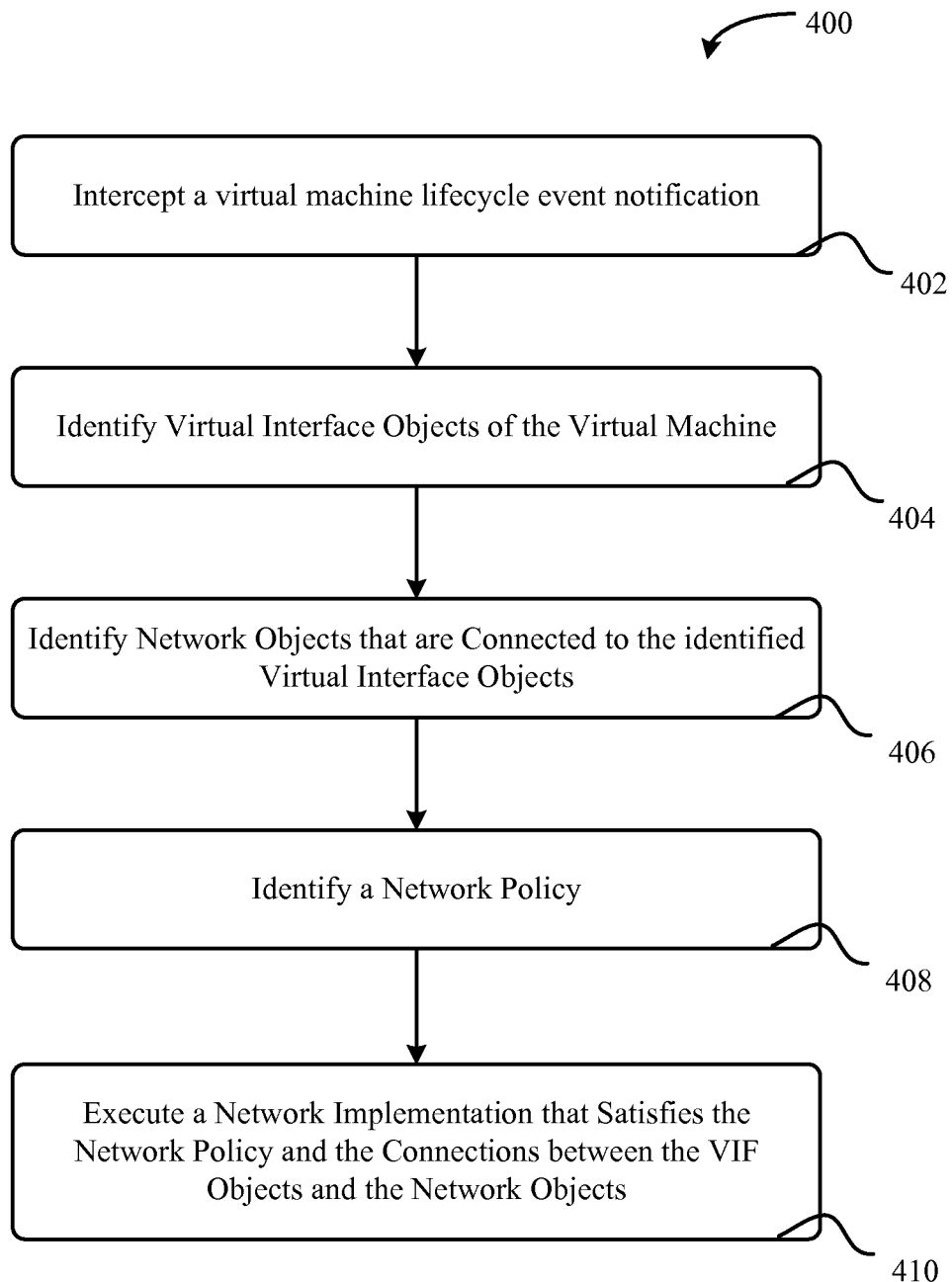
FIG. 4 is a flow diagram that depicts an embodiment of a method for selecting a network implementation.

Illustrated in FIG. 4 is one embodiment of a method 400 for implementing a network configuration. In one instance, the control program 220 of a control virtual machine 340 intercepts a virtual machine lifecycle event notification (Step 402). Upon receiving the lifecycle event notification, the policy engine 322 can identify VIF objects 332 of the virtual machine 232 that generated the lifecycle event (Step 404), and can identify network objects 335 that are connected to the identified VIF objects 332 (Step 406). Upon identifying the VIF objects 332 connected to one or more network objects 335, the policy engine 322 can identify a network policy 320 (Step 408). The policy engine can then execute a network implementation that satisfies the identified policy 320, network objects 335 and VIF objects 332 (Step 410). In some embodiments, the method 400 can be carried out in whole or in part by any of the following objects or applications: the control program 220; the network policy engine 322; the control virtual machine 340; and the virtualization environment 302.

Further referring to FIG. 4, and in more detail, in one embodiment the control program 220 intercepts a virtual machine lifecycle event notification (Step 402). In other embodiments, any of the following applications or objects can intercept the virtual machine lifecycle event notification: the tool stack 224 of the control program 220; the network policy engine 322; the virtualization environment 302; any application executing on the control virtual machine 340; a network engine 322; or the control virtual machine 340. In still other embodiments the lifecycle event is generated in response to a control API call in which a client of the toolstack requests a virtual machine state change. These API calls can be transmitted by the client to the toolstack, and for example may be one of the following API calls: VM.start(vm identifier); or VM.shutdown(vm identifier). The argument in each of these API calls is an identifier of the virtual machine that the virtual machine would like to start or shutdown. In some embodiments, the control program 220 can intercept or receive the virtual machine lifecycle event from a VIF object 332, or any other application or object executing on the virtual machine 232 experiencing the lifecycle event. A virtual machine lifecycle event can include starting a virtual machine 232, stopping a virtual machine 232, migrating a virtual machine 232 or re-booting a virtual machine 232. Generating a lifecycle event, in some embodiments, can occur before or after the lifecycle event occurs. In many embodiments, the virtual machine 232 can generate the lifecycle notification in response to the occurrence of the lifecycle event. For example, when starting a virtual machine 232, the lifecycle event is generated after the virtual machine 232 boots.

In some embodiments, the control program 220 intercepts lifecycle events for those virtual machines 232 that have a VIF object 332 on a local network. This VIF object 332, in many instances has an associated network configuration or policy. When a lifecycle event occurs, the toolstack 224 of the control program 220 can obtain information about the network configuration of the VIF object 332 and can use that information to determine whether a network object 335 having a required network configuration that lists the VIF object 332, exists.

Upon receiving a lifecycle event, a VIF object 332 of the virtual machine 232 that generated the lifecycle event can be identified (Step 404). In some embodiments, the method 400 further includes first invoking the network policy engine 322, or an instance of the network policy engine 322, which identifies the VIF object(s) 332. The network policy engine 322, in other embodiments, can execute substantially all the time such that anytime a virtual machine 232 generates a lifecycle event notification, the policy engine 322 can responsively identify the VIF object(s) 332 of that virtual machine 232. In other embodiments, a separate program, such as the control program 220, identifies the VIF object(s) 332. The VIF object(s) 332 can be interface objects executing or stored within the virtual machine 232 that generated the lifecycle event. For example, when a virtual machine starts, the network policy engine 322 or some other application executing within the control virtual machine 340 identifies the VIF object(s) 332 within the virtual machine 232 that started.

Once the VIF object 332 of the virtual machine 232 is identified, a network object 335 that is connected to the identified VIF object(s) 332 is identified (Step 406). In some embodiments, identifying the network object 335 can include querying or parsing the toolstack metadata to identify a network object 335 includes an identifier corresponding to the identified VIF object 332. The network object 335 can include a listing of those VIF objects 332 that are linked or registered with the network object. Thus, identifying a network object 335 can include parsing the list of each network object 335 stored within the toolstack metadata. A network object 335 can be connected, linked or otherwise associated with one or more VIF objects 332. In some embodiments, more than one network object 335 can correspond to a particular VIF object 332. In some embodiments, the policy engine 322 can facilitate this process by obtaining an identifier for the VIF object 332, and parsing the tool stack metadata for the VIF's identifier.

The method 400 described in FIG. 4 can include identifying one or more VIF objects 332 and one or more network objects 335. Similarly, the method 400 can include identifying any combination of VIF objects 332 and network objects 335. For example, two VIF objects 332 can correspond to a single network object 335, while in other embodiments a single VIF object 332 can correspond to multiple network objects 335.

Upon identifying the VIF objects 332 of the virtual machine 232 and the network objects 335 of the virtual machine 232, a network policy can be identified (Step 408). Identifying a network policy 320 can include identifying a network policy 320 of a network object 335. In other embodiments, identifying a network policy 320 can include identifying a network policy 320 of the virtual machine 232 or of a VIF object 332. The identified network policy 320 can place constraints on the eventual network implementation generated by the network policy engine 322. In some instances, the network implementation is created so that it satisfies the constraints imposed by the identified network policy 320 and the constraints imposed by the connection between the VIF object 332 and the network object 335.

In some instances, the network policy engine 322 may fail to identify an appropriate network configuration of network objects 335 and VIF objects 332 that satisfies one or more network policies 320, or that comports with the lifecycle event. In these instances, an error can be generated which causes the process 400 to stop. In some embodiments, the control program 220 can further respond to a failure to identify a preexisting network configuration by generating a VIF object 332 and/or network object 335 that together satisfy the identified network policy 320 and implements the lifecycle event operation.

In other instances, the control program 220 may intercept a lifecycle event that requires selecting a server to execute a virtual machine, application or service. For example, when booting a virtual machine 232, the control program 220 may need to select a physical computer 201 that has an adequate amount of resources to service the virtual machine 232. In this example, the control program 220 may have to select a server or computer to execute the virtual machine 232. Selecting the server or computer, in some embodiments, can be a process based in part on network policies associated with the virtual machine 232 via a VIF object, a virtualization environment 302 or a user.

In some instances, a virtual machine lifecycle event can require the establishment of one or more network connections. For example, if a virtual machine 232 includes a VIF object 332 that establishes a network connection, when the virtual machine 232 is stopped, the network configuration is interrupted. Thus, when the virtual machine 232 reboots, the network connections may be reestablished according to one or more network policies 320. Establishing the network connection can include: identifying a tag or identifier of a VIF object 332 of the virtual machine 232; determining whether the tag is listed in a network object 335; identifying a network policy 320; and selecting a low level network implementation that satisfies the network policy 320 and the connections established between the VIF object 332 and the network object 335.

The control program 220 or network policy engine 322 can use the identified network policies 320 to parse the toolstack 224 metadata for a VIF object 332 and network object 335 that satisfies the policies 320. Upon identifying the one or more VIF objects 332, the network object 335 and the network policy 320, the network policy engine 322 can select a particular, low level network implementation that satisfies the network policy 320 constraints and the connections imposed by the VIF object(s) 332 and the network object(s) 335. In some embodiments selecting this network implementation may include performing an exhaustive or heuristic search. In some embodiments, there may be multiple network implementations that satisfy the network constraints required by the policy 320 and the VIF object/network object. Selecting, generating or executing this low level implementation can include selecting and configuring the particular network components so that the resulting network satisfies the network policy 320 and the VIF object/network object connection. Selecting and executing the network implementation can include creating or modifying tunnels that can service network traffic received/transmitted by the selected network configuration (e.g. network object). Creating or modifying communication tunnels can include implementing GRE tunnels, ssh tunnels, virtual switches, etc.

In one example, when a virtualization environment 302 or control program 220 receives a lifecycle event notification, flag or message from a virtual machine 232 executing within the virtualization environment 302, the control program 220 can direct the network policy engine 322 to generate a network implementation. The method of generating and executing a network implementation can first include searching for VIF objects 332 of the virtual machine 232 that experienced the lifecycle event and caused the generation of the lifecycle event notification. The method further includes identifying network objects 335 that are connected or associated with the VIF objects 332. A network policy 320 is then identified and a determination is made as to whether the network objects 335 and its connected VIF objects 332 satisfy the constraints imposed by the network policy 320. When they do, the network policy engine 322 selects a low level network implementation that satisfies the network policy 320 and that abides by the connections between the network objects 335 and the VIF objects 332. When they do not satisfy the constraints, an error is thrown indicating there is no corresponding configuration of VIF objects/network objects that satisfies the policy 320.

While certain exemplary embodiments have been described and shown in the accompanying drawings, it is to be understood that such embodiments are merely illustrative of and not restrictive on the methods and systems described herein. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

What is claimed is:

1. A method of selecting a network implementation using network policies within a virtualization environment, comprising:
    identifying, by a policy engine, a virtual interface object of a virtual machine that generated a lifecycle event;
    obtaining, by the policy engine, an identifier associated with the virtual interface object;
    identifying, by the policy engine, a network object using the identifier associated with the virtual object;
    identifying, by the policy engine, a network policy implemented by the network object;
    identifying, by the policy engine, a second virtual interface object based on the network policy implemented by the network object; and
    establishing, by the policy engine, a network configuration with attributes identified by the network policy and that satisfies a connection established between the second virtual interface object and the network object.

2. The method of claim 1, comprising:
    receiving, by a control program executing within a virtualization environment on a computing device, an event notification generated by the virtual machine responsive to the lifecycle event; and
    invoking, by the control program responsive to receiving the event notification, the policy engine.

3. The method of claim 2, comprising generating the event notification responsive to the lifecycle event, the lifecycle event comprising any combination of: starting the virtual machine, migrating the virtual machine, rebooting the virtual machine, and stopping the virtual machine.

4. The method of claim 1, comprising identifying one or more network configurations comprising the first virtual interface object and the network object.

5. The method of claim 4, wherein identifying one or more network configurations further comprises parsing metadata of a tool stack of the control program.

6. The method of claim 2, comprising generating the event notification responsive to the lifecycle event, the lifecycle event requiring an execution server.

7. The method of claim 6, comprising selecting an execution server based in part on the network policy of the virtual machine.

8. The method of claim 1, comprising applying the network policy, wherein applying the network policy further comprises at least one of: specifying whether network traffic requires encryption, restricting a local network to a single host, or specifying one or more physical interfaces for communicating network traffic.

9. The method of claim 1, comprising parsing a toolstack metadata using the identifier to identify the network object.

10. The method of claim 1, wherein the network object includes a listing of virtual interface objects registered with the network object.

11. A system for selecting a network implementation by application of a network policy to existing network configurations within a virtualization environment of a computing device, the system comprising:
    a computing device that executes a control program and a policy engine within a virtualization environment;
    a virtual machine that generates an event notification responsive to a lifecycle event;
    the policy engine that:
        identifies a first virtual interface object of the virtual machine that generated the lifecycle event;
        obtains an identifier associated with the first virtual interface object;
        identifies a network object based on the identifier associated with the virtual object;
        identifies a network policy implemented by the network object;
        generates a second virtual interface object based on the network policy implemented by the network object; and
        establishes a network configuration with attributes identified by the network policy and that satisfies a connection established between the second virtual interface object and the network object.

12. The system of claim 11, wherein the control program:
    receives the event notification, and
    invokes the policy engine responsive to receiving the event notification.

13. The system of claim 11, wherein the lifecycle event comprises any combination of: starting the virtual machine, migrating the virtual machine, rebooting the virtual machine, and stopping the virtual machine.

14. The system of claim 11, wherein the control program identifies one or more network configurations comprising the first virtual interface object and the network object.

15. The system of claim 14, wherein the control program identifies one or more network configurations by parsing metadata of a tool stack of the control program.

16. The system of claim 11, wherein the lifecycle event requires an execution server.

17. The system of claim 16, wherein the policy engine selects an execution server based in part on the network policy of the virtual machine.

18. The system of claim 11, wherein the network policy specifies at least one of: whether network traffic requires encryption, restricts a local network to a single host, or one or more physical interfaces for communicating network traffic.

19. The system of claim 11, wherein the policy engine parses a toolstack metadata using the identifier to identify the network object.

20. The system of claim 11, wherein the network object includes a listing of virtual interface objects registered with the network object.

* * * * *